United States Patent
Powell

(10) Patent No.: US 6,786,325 B2
(45) Date of Patent: Sep. 7, 2004

(54) GUIDING A FLEXIBLE BAND

(75) Inventor: Wade A. Powell, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 10/060,682

(22) Filed: Jan. 30, 2002

(65) Prior Publication Data

US 2003/0136646 A1 Jul. 24, 2003

(51) Int. Cl.$^7$ .............................................. B65G 39/16
(52) U.S. Cl. ................... 198/807; 198/810.03; 198/806
(58) Field of Search ................................ 198/806, 807, 198/810.03

(56) References Cited

U.S. PATENT DOCUMENTS

| | | | |
|---|---|---|---|
| 2,488,859 A | * 11/1949 | Garber | ........................ 198/806 |
| 4,098,186 A | * 7/1978 | Mitter | ...................... 101/127.1 |
| 4,337,598 A | 7/1982 | Barth et al. | |
| 4,552,295 A | * 11/1985 | Smith et al. | ................. 226/180 |
| 4,629,061 A | 12/1986 | Crandall | |
| 4,693,363 A | * 9/1987 | Kuehnert | ..................... 198/807 |
| 5,324,957 A | * 6/1994 | Hejazi | ......................... 250/589 |
| 5,382,207 A | * 1/1995 | Skowronski et al. | ......... 482/54 |
| 5,479,241 A | 12/1995 | Hou et al. | |
| 5,659,851 A | 8/1997 | Moe et al. | |

* cited by examiner

*Primary Examiner*—Richard Ridley

(57) ABSTRACT

A steering device and method for a steering roller guiding a flexible band. The device includes a worm and worm wheel transmission mounted to the roller at one axial end thereof. Coupled to the transmission, a motor is provided for receiving signals for bidirectionally steering the band on the roller via the transmission.

5 Claims, 4 Drawing Sheets

GUIDING A FLEXIBLE BAND

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND

1. Field of Technology

The present invention relates generally to transport belts and webs.

2. Description of Related Art

Conveyor belts, such as endless belts, are known in the art, useful for continuously transporting materials from one point to another. Note that by "endless," a continuous loop is denoted; in actuality, the belt can be a flat strip of material in which the two ends are joined or seamed. An endless belt spans and has a partial wrap around two or more rollers to form a loop, where at least one of the rollers is driven to drive the belt around the transport loop. Frictional or vacuum forces, or both, are generally used to adhere materials to be transported to an outer surface of the belt. One problem associated with endless belt transports is keeping the belt properly aligned on the set of rollers.

An endless belt cycled over rollers generally needs to be steered. Lateral movement of a belt with respect to an axle of a roller—also referred to in the art as "drift, "walk" and other colloquial terms—needs to be restrained; otherwise, the belt is found to move partially or completely off the rollers during repeated cycling. The challenge of keeping the belt properly aligned is magnified when the material being transported must be transported to a very specific location. For example, in a hard copy apparatus, transporting a sheet of print media, e.g., paper, to a specific printing zone where images or alphanumeric text are formed affects print accuracy and quality. Some of the belt tracking and steering systems attempting to keep the belt running straight include those referred to as "active steering" and "passive steering."

Passive steering may be accomplished with a mechanism that biases the belt to a known and fixed position. For example, the belt may be steered by a flange on at least one of the rollers or by one or more stationary guides along at least one lateral edge of the belt. Passive steering generally leads to the eventual failure of the belt by wearing and cracking the belt. Furthermore, passive tracking methods force the belt into one drive line, which can lead to increasing torque loads on drive motors. Non-metallic and otherwise more flexible belts can also be passively steered by "crowning" one or more of the rollers, an option generally not available for metal and less flexible belts without yielding the belt materially. Moreover, passive steering mechanisms can be thrown off by changes in friction which can be caused by different tensile loads on the belt, higher or lower vacuum levels, heat, wear, normal forces, and the like.

Active steering is the use of a sensing device that feeds real time position information back to a steering roller of the belt transport loop mechanism. A change in the mechanism is initiated to produce a steering effect on the belt to correct for any deviation from its desired position. One active steering solution is to adjust the belt tension on one side. Another active steering solution is to sense current belt position and to steer the belt accordingly by a predetermined movement of the steering roller. Active belt tracking and steering systems typically include: a sensor for determining when the belt is deviating from a desired alignment, a steering roller which can be skewed relative to the line of travel of the belt within a field of view of the sensor, and a steering roller control associated with the sensor and roller for controlling the axial position of the steering roller. Electronic circuits, programmed routines, and other equivalents known to those skilled in the art, may be used to monitor signals from the sensor, determine required adjustments, and then make adjustments using the re-positioning control.

Note that the same problem and similar solutions are also associated with general conveyor belt systems and web control.

BRIEF SUMMARY

A steering device and method for a steering roller guiding a flexible band is described. The device includes a worm and worm wheel transmission mounted to the roller at one axial end thereof. Coupled to the transmission, a motor is provided for receiving signals for bidirectionally steering the band on the roller via the transmission.

The foregoing summary is not intended to be an inclusive list of all the aspects, objects, advantages and features, nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of its nature in order to be of assistance in aiding ready understanding of the patent in future searches.

Like reference designations represent like features throughout the drawings. The drawings referred to in this specification should be understood as not being drawn to scale except if specifically annotated.

DETAILED DESCRIPTION

Reference is made now in detail to embodiments illustrating the best mode contemplated for practicing the invention.

The illustrated embodiments described herein relate to an active steering design which automatically steers the belt to the approximate center of its range of lateral motion instead of limiting its travel at the extremes of lateral motion. These embodiments are preferred to tension adjusting solutions in that less-compliant belts respond more quickly and active forces can be used to implement the appropriate steering. Tensile differences from one side of the belt to the other are overcome. Again, such control problems are also associated with general conveyor belt systems and web control. Thus, specific implementations of the present invention may also be tailored to aligning and re-aligning a web material on a set of rollers or with general conveyor belt systems. Therefore, the term "flexible band" is used generically herein to indicate a conveyor belt, an endless loop belt, a web, or equivalents known to those skilled in the art.

Figure 1:
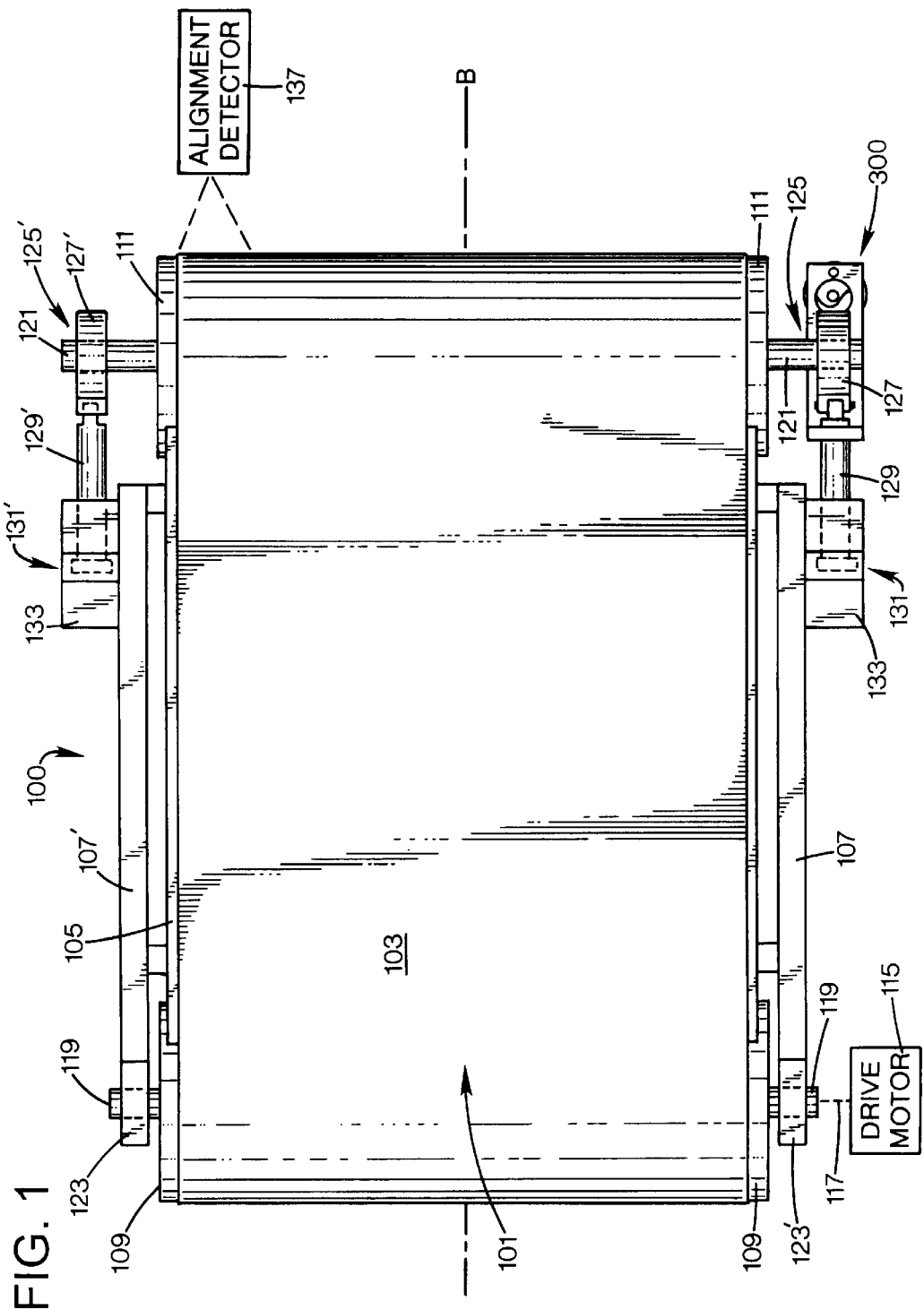
FIG. 1 is a top plan view according to an illustrated embodiment of the present invention in combination with an exemplary system implementation.

FIG. 1 is a plan view of an endless belt transport system 100. Simultaneous reference to FIG. 2, a side elevational view, with some exposed elements, may facilitate understanding of the embodiment described in detail hereinafter. As an exemplary embodiment, the use of this invention may be considered with respect to a hard copy apparatus having a printing engine 201—e.g., ink-jet, electrostatic, electrophotographic, or the equivalents known to those skilled in the art—shown in dashed lines in FIG. 2 only. The belt 101 may be used to transport a sheet of print media from an input supply 207 through a printing zone 205 to an output port, such as a printed document receiving tray 203. No limitation on the scope of the invention is intended nor should any be implied from this example of one useful embodiment.

The endless belt 101 has an outer surface 103 upon which the media adheres and is moved from the input supply 207 to the output 203. A platen 105 may support the belt 101 through the printing zone 205. Assume for this exemplary embodiment that the belt 101 is a perforated, vacuum belt, and that the platen 105 also serves as a vacuum plenum, coupled to any known manner mechanism—e.g., suitable to the state-of-the art and specific implementations—for producing the vacuum force 207 appropriately positioned. The system includes a structural frame or system chassis, illustrated herein as members 107, 107' of the endless belt transport system 100.

The endless belt 101 is wrapped around two rollers 109, 111. Note that in this embodiment, it is a partial wrap configuration. An inner surface 113 (FIG. 2 only) of the belt 101 is in contact with each roller 109, 111. A drive motor 115 is coupled in a known manner—illustrated as a phantom line 117—to the drive roller 109 or its axle 119 and used to impart motion to the belt 101 (note: motion may be bi-directional). Suitable axle shaft end bearings 123, 123' for mounting the roller 109 to the frame members 107, 107' at each lateral extremity are provided.

The steering roller 111 similarly has an axle 121 whereby it can both rotate and guide the belt 101. At one end 125' of the steering roller axle 121 (FIG. 1), the axle shaft is suitably mounted using a first bearing 127'. That end bearing 127' is fixedly attached to a first roller tension rod 129'. The first roller tension rod 129' is affixed to the adjacent frame member 107' via a known manner belt tensioning mechanism 131' (FIG. 1 only, but see also counter-positioned, complementary-acting, belt tensioning mechanism 131 of FIG. 2).

Figure 2:
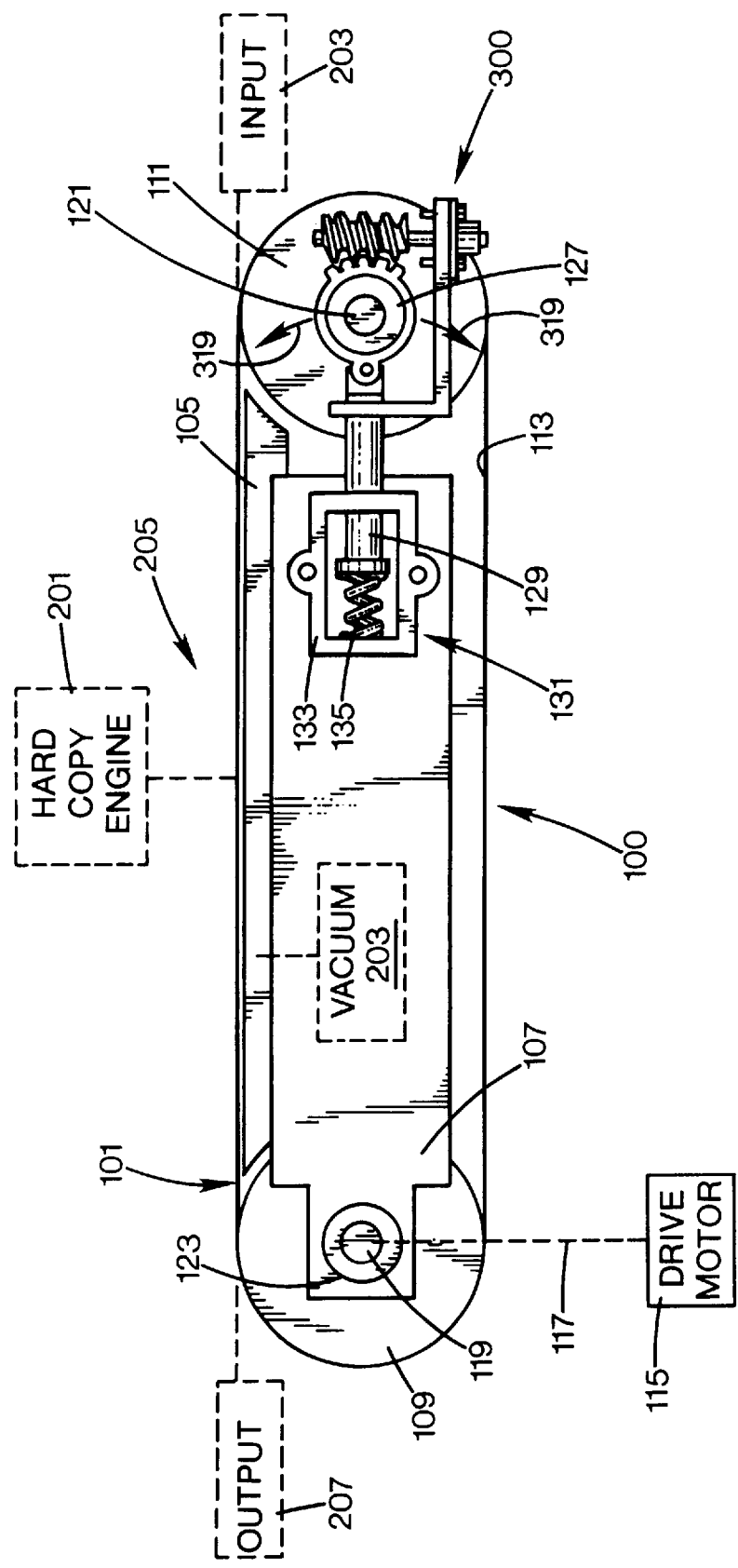
FIG. 2 is a side elevational view (some elements partially exposed) according to the embodiment of FIG. 1.

A variety of belt tensioning mechanisms are known to those skilled in the art. As best seen in FIG. 2 where the tensioning mechanism is exposed, the exemplary belt tensioning mechanism 131 comprises a tensioner mount 133, encasing a biasing member (e.g., a coil spring) 135 which provides a suitable tensioning force for the belt 101 via the tensioning rods 129, 129' to the steering roller axle 121.

Figure 3:
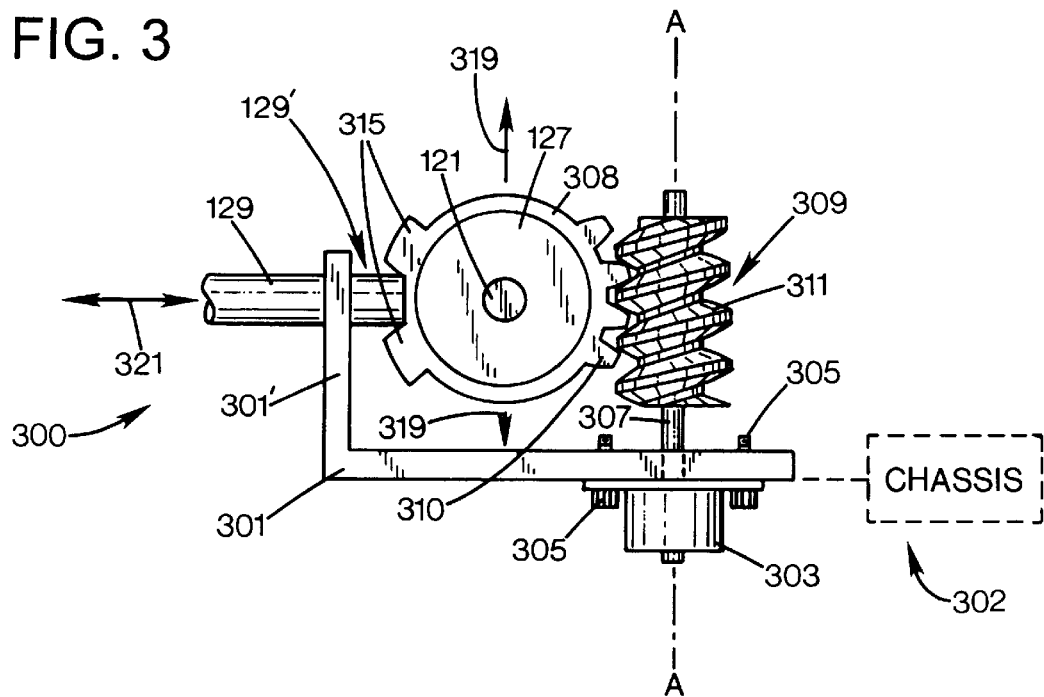
FIG. 3 is a side elevational view of details of the system of FIG. 1 according to an embodiment of the present invention.
Figure 4:
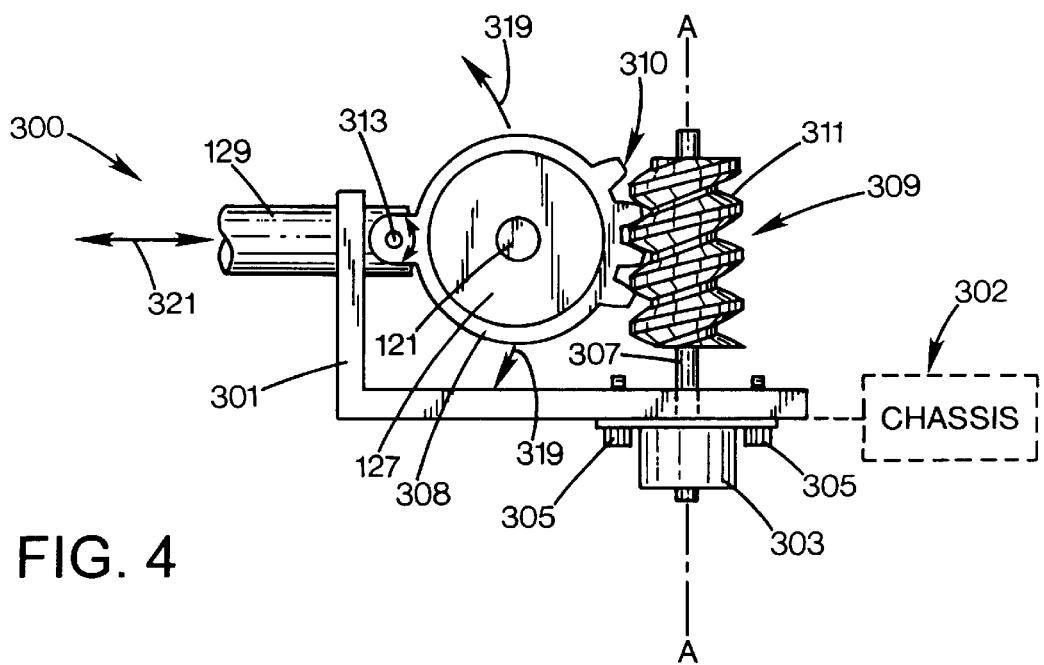
FIG. 4 is a side elevational view of details for the system of FIG. 1 according to an alternative illustrated embodiment to that shown in FIG. 3.

At a second end of the steering roller axle 121, the steering roller axle 121 is supported by a belt steering device 300. Alternative embodiments of the belt steering device 300 are illustrated in FIGS. 3 and 4; the embodiment of FIG. 4 is also specifically shown in FIG. 2.

A suitable belt steering device 300 mounting bracket 301, 301' may be fixedly mounted to the tensioning rod 129—note that a bracket guide may also be provided with respect to the system chassis, or housing, 302, illustrated in dashed lines, for providing a more stable device platform. A precision-drive motor 303, i.e., one allowing for relatively small adjusting movements, such as a stepper motor, is attached to the bracket 301, such as by bolts 305 through the bracket, or the equivalent as would be known to those skilled in the art. The motor drive shaft 307 protrudes through the bracket 301 along a first axis A—A; note that while axis A—A is shown in the vertical, the axes of operation are relative and specific to any particular implementation; no limitation on the scope of the invention is intended nor should any be implied therefrom. A worm 309 is mounted on the drive shaft 307 for bi-directional rotation therewith (note that alternatively the worm may be integral to a motor shaft, forming a shank having at least one complete tooth, or "thread," around the pitch surface). Rigidly attached to the roller axle 121 via the axle bearing 127 is a worm wheel 308, having teeth 310 meshed with the threads 311 of the worm 309. Note that it is preferred to mount the worm wheel 308 to an axle bearing to ensure low friction and smooth motion during worm wheel 308 drive operations (described below). In combination, the worm 309 and worm wheel 308 cooperate to transmit bi-directional drive forces imparted by the motor 303 to the steering roller 111.

Generally opposite the teeth 310, the worm wheel 308 is mounted onto the belt tensioning rod 129. In the embodiment of FIG. 3, the worm wheel 308 may be connected by a pivot pin 313 to the rod 129; see also FIG. 1 for another perspective of this worm wheel to tensioning rod attachment. In the embodiment of FIG. 4, the mounting bracket 301 may be affixed to the rod 129 by the ascending arm 301' and the rod may be mated between cams 315 on the face of the worm wheel 308 generally opposite the teeth 310. The rod 129 has an extremity 129' which rides between the cams 315, allowing movement of the worm wheel 308 without losing any tensioning force against the steering roller 111. In other words, the belt steering device 300 will automatically move with the tensioning rod 129 as the belt tension is adjusted, as illustrated by double-headed arrow 321. The embodiment of FIG. 3 is more easily constructed assembly of the steering device 300; more over, the worm wheel 308 is better positioned and controlled with respect to adjacent parts. A relatively large gear reduction for the worm:worm wheel is preferred. For example, it has been found that a ratio in the range of 40:1 to 60:1 is particularly suited to an ink-jet hard copy apparatus handling A-size, or "letter size," print media where precision in placement of print media in a printing zone affects print quality. It is preferred that the worm 309 and worm wheel 308 be of a substantially rigid material—e.g., metal, a hard plastic, or the equivalents that would be known to those skilled in the art—such that manufacturing tolerances and operational tolerances are reduced to a minimum for more economical gear production.

There are many belt alignment tracking devices known in the art. The present invention may be employed in conjunction with an endless belt transport system 100 using any such alignment tracking device—e.g., an optical or mechanical device—shown generically in FIGS. 1 and 5 as an "Alignment Detector" 137. Tight belt alignment control, i.e., relatively fine adjustments, may provided by using the stepper motor 303 in conjunction with the worm 309 and worm wheel 308 in response to feedback from the alignment detector 137. Note that use of a worm wheel 308 also prevents backward driving, also enabling better steering control of the belt 101. Standard manufacturing calibration techniques can be employed for centering the drive line and specifying appropriate tolerances based on the specific implementation envisioned. The alignment detector 137, as well as other active subsystems of the apparatus, is connected—illustrated by dashed lines—to a system controller 400, e.g., a microprocessor with associated algorithm programming, application specific integrated circuit (ASIC), or the equivalent as would be known to those skilled in the art, for processing signals representative of detector output and control. In general, the illustrated belt 101 maintains center-line tracking (see dashed line B—B in FIG. 1) in the planes of the belt material when traveling the loop about the rollers 109, 111.

Operation of the belt steering device 300 and belt tracking control is best seen with respect to FIGS. 2, 3, 4 and 5. It is a real-time, active steering design that prevents endless belts from tracking off-line. It has been found that the illustrated design is particularly effective for steering relatively rigid material (e.g., thin metal) belts over relatively long spans. Moreover, the design can compensate for non-concentricity of the rollers 109 and 111.

Figure 5:
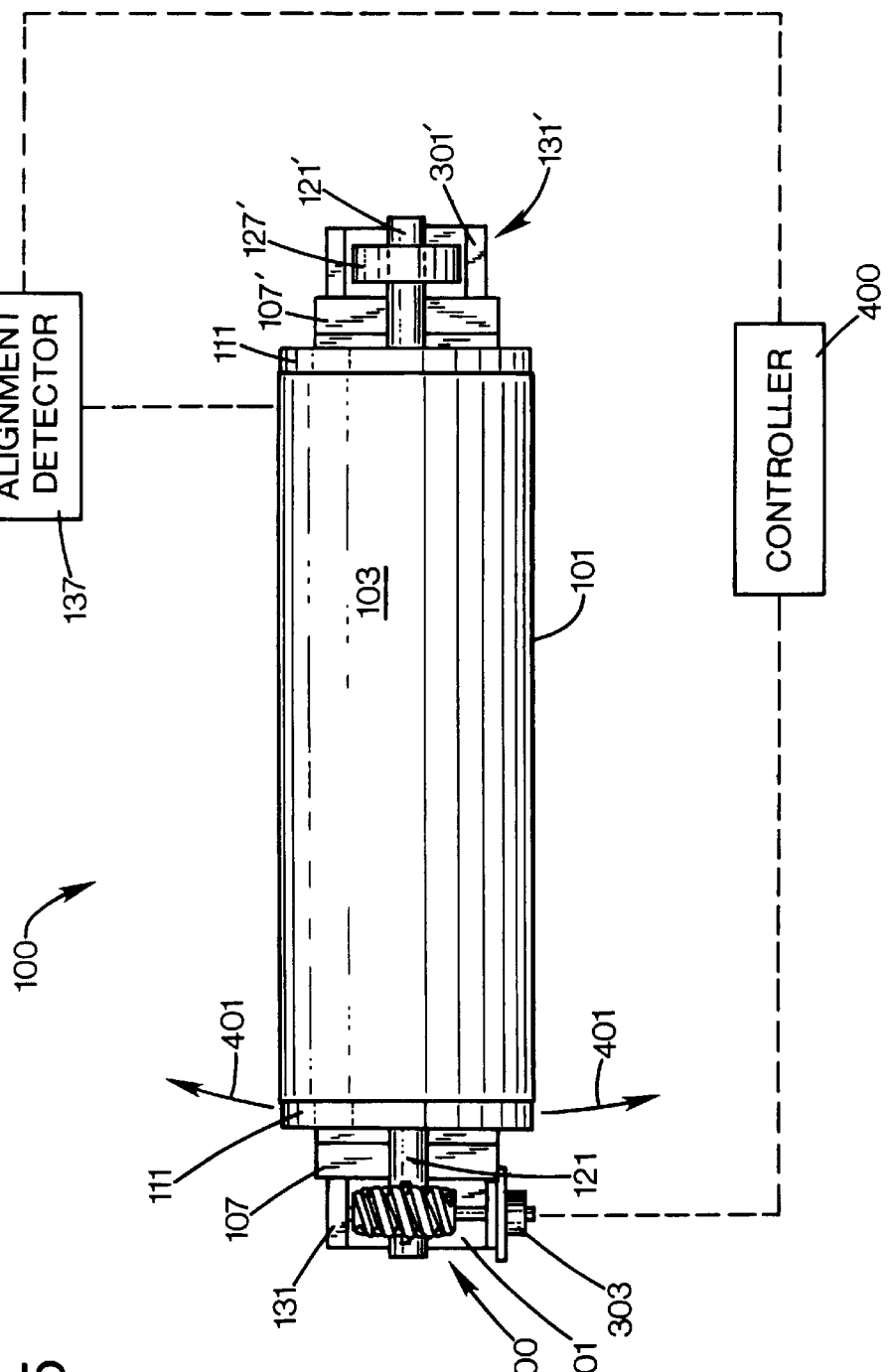
FIG. 5 is an end elevational view, some elements partially exposed, according to the embodiment shown in FIG. 1.

For calibration, the belt 101 is advanced forward and intentionally steered toward one side of the steering roller 111. This is done by turning the worm 309 using the stepper motor 303 until the worm wheel 308 reaches a position at which transport operations would be adversely affected. For example, the position may be changed until reaching a mechanical stop (not shown), a sensed attitude, or the equivalent as would be known in the art, with the belt 101 off-line to a predetermined degree noted by the alignment detector 137, e.g., by leaving the detector field-of-view. In other words, as the worm wheel 308 is translated, illustrated by the arrows 319 in FIGS. 2, 3 and 4, the steering roller 111 is tilted with respect to the transport plane of the system 100, as illustrated in FIG. 5 by arrows 401. At this stop position, the alignment detector 137 can be calibrated for sensing an off-line tolerance limit for a first lateral side of the steering roller 111. The process is repeated for the other side of the steering roller 111. The stepper motor 303 is then positioned in a theoretically straight tracking line based on the off-line lateral limits so established; the detector 137 signals at this position are thus a value representative of the preferred center-line tracking position of the belt 101.

Now, during transport operations, for each predetermined advancement of the belt 103 (e.g., a predetermined percent rotation of the drive roller 109, or the like), a control algorithm may employed using data from the two most recent positions sensed by the alignment detector 137 (e.g., before and after the drive movement) to determine the new position for the stepper motor 303 to drive to in order to steer the belt 101 in real time back to the desired alignment detector center-line tracking value.

It will be recognized by those skilled in the art that the present invention may be adapted for a wide variety of flexible band, belt, and web systems where two or more rollers may be employed. The steering device 300 can be employed with each roller where lateral drift of the flexible band may affect operations.

For implementations in a desktop apparatus, such as hard copy apparatus, the present invention mounting scheme and operation permits narrower platens, vacuum boxes, media heaters, and other print engine components, which leads to a smaller footprint for the product. Accurate belt tracking control provided by the relatively large gear reduction with the worm wheel 308, worm 311, and stepper motor 303 allows for very fine adjustments for precision placement of belt-transported materials to given locations—e.g., such as those associated with printing an image or alphanumeric text. Note that this active tracking can be implemented to track the belt to several different predefined locations; in other words, more than one tracking line. Thus, it is useful also in reducing wear to other piece parts of the system.

The foregoing description of the illustrated embodiments have been presented for purposes of illustration and description. It is not intended to be exhaustive or to limit the invention to the precise form or to exemplary embodiment(s) and implementation(s) disclosed. Clearly, many modifications and variations will be apparent to practitioners skilled in this art. Similarly, any process steps described might be interchangeable with other steps in order to achieve the same result. At least one preferred embodiment was chosen and described in order to best explain the principles of the invention and a best mode of practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

What is claimed is:

1. A steering device for a steering roller guiding a flexible band, the device comprising:

a worm and a worm wheel mounted to a steering roller axle bearing, the worm wheel fixedly attached to a first roller tension rod; and the worm engaging the worm wheel, the worm coupled to a motor for transmitting bi-directional drive forces to the steering roller through the worm wheel.

2. A device as set forth in claim 1 wherein the worm wheel is affixed to an axle bearing associated with the roller such that axial tilting of the roller is effected via the bearing when imparts motion to the worm wheel.

3. A device as set forth in claim 1 the worm and the worm wheel have a worm:worm wheel reduction ratio in the range of 40:1 to 60:1.

4. A device as set forth in claim 1 wherein the band is an endless belt.

5. A device as set forth in claim 1 wherein the band is a web.

* * * * *